(12) United States Patent
Sugino et al.

(10) Patent No.: US 11,976,790 B2
(45) Date of Patent: May 7, 2024

(54) LOSS-ON-IGNITION ESTIMATION APPARATUS, LOSS-ON-IGNITION ESTIMATION METHOD, MACHINE-LEARNING APPARATUS, AND MACHINE-LEARNING METHOD

(71) Applicant: SINTOKOGIO, LTD., Nagoya (JP)

(72) Inventors: Takehiro Sugino, Toyokawa (JP); Takashi Hanai, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 628 days.

(21) Appl. No.: 17/190,974

(22) Filed: Mar. 3, 2021

(65) Prior Publication Data
US 2021/0301983 A1 Sep. 30, 2021

(30) Foreign Application Priority Data
Mar. 31, 2020 (JP) ................................. 2020-063305

(51) Int. Cl.
*F17D 1/08* (2006.01)
*B22C 19/04* (2006.01)
*G06N 20/00* (2019.01)

(52) U.S. Cl.
CPC .............. *F17D 1/088* (2013.01); *B22C 19/04* (2013.01); *G06N 20/00* (2019.01)

(58) Field of Classification Search
CPC ....... F17D 1/088; B22C 19/04; B22C 5/0459; B22C 5/0463; B22C 5/0472; B22C 5/08;
(Continued)

(56) References Cited

U.S. PATENT DOCUMENTS 6,286,580 B1 * 9/2001 Ward ................... B22C 1/2253
164/520
2018/0133719 A1 * 5/2018 Oba ......................... B22C 5/16
(Continued)

FOREIGN PATENT DOCUMENTS

JP 2004074245 A 3/2004
JP 2004181486 * 7/2004 ............... B22C 5/00
(Continued)

OTHER PUBLICATIONS

Jadwiga Kaminska et al., "Strength Parameters and a Mechanical Reclamation together with the Management of its By-Products", Metallurgy and Foundry Engineering, vol. 38, 2012, No. 2, pp. 171-178.*
(Continued)

*Primary Examiner* — Alexander Satanovsky
(74) *Attorney, Agent, or Firm* — Harness Dickey & Pierce P.L.C.

(57) ABSTRACT

An object is to accurately estimate loss-on-ignition in a short time. A loss-on-ignition estimation apparatus includes at least one processor configured to carry out an estimation step, the estimation step including estimating the loss-on-ignition of foundry sand with use of a learned model constructed by means of machine learning. The learned model is configured to receive, as input, (1) sand weight data relating to a weight of the foundry sand detected in a calcination period and (2) at least one of (i) sand property data relating to one or more properties of the foundry sand, (ii) additive data relating to one or more additives added to the foundry sand, and (iii) calcination environment data relating to a calcination environment detected in the calcination period. The learned model is configured to generate, as output, an estimated loss-on-ignition of the foundry sand.

8 Claims, 6 Drawing Sheets

(58) Field of Classification Search
CPC ......... B22C 5/045; G06N 20/00; G06F 30/20; G06F 2119/08
See application file for complete search history.

(56) References Cited

U.S. PATENT DOCUMENTS

2019/0138373 A1* 5/2019 Nicol .................. G06N 3/063
2020/0151613 A1* 5/2020 Yoo .................... G06F 11/3466

FOREIGN PATENT DOCUMENTS

| JP | 2004181486 A | 7/2004 |
| JP | 2015208781 A | 11/2015 |

OTHER PUBLICATIONS

Binoniemi, Benjamin J., "Loss on Ignition Using Infrared Heating" (2015). Master's Theses, 556, https://scholarworks.wmich.edu/masters_theses/556, 35 pages.*

Notice of Allowance from corresponding JP Application No. 2020-063305 dated Jan. 31, 2023.

* cited by examiner

LOSS-ON-IGNITION ESTIMATION APPARATUS, LOSS-ON-IGNITION ESTIMATION METHOD, MACHINE-LEARNING APPARATUS, AND MACHINE-LEARNING METHOD

This Nonprovisional application claims priority under 35 U.S.C. § 119 on Patent Application No. 2020-063305 filed in Japan on Mar. 31, 2020, the entire contents of which are hereby incorporated by reference.

FIELD OF INVENTION

The present invention relates to an apparatus and method for estimating the loss-on-ignition of foundry sand using a learned model. The present invention also relates to an apparatus and method for constructing such a learned model.

BACKGROUND OF INVENTION

Foundry sand that hardens via a chemical reaction of a hardening agent (sand for use in, for example, a self-hardening process or gas-hardening process) is widely used as one of the various types of foundry sand for use in making a mold. Foundry sand used in casting is polished in a sand reclaimer, mixed with a resin and a hardening agent in a mixing machine, and then reused in molding. In so doing, the conditions under which the sand reclaimer, the mixing machine, and the like operate are optimized in accordance with the loss-on-ignition of the foundry sand used in casting.

The loss-on-ignition of foundry sand means the amount of resin remaining in the foundry sand used in casting, and is determined by drying and then calcining the foundry sand. The temperature at which the foundry sand is calcined is 1000° C., and the time for which the foundry sand is calcined is 60 minutes. A widely used definition for loss-on-ignition is $(W0-W60)/W0$, where $W0$ [g] is the weight of dried but not calcined foundry sand and $W60$ is the weight of calcined foundry sand. The loss-on-ignition is also called "LOI".

However, for the loss-on-ignition to be determined using the above-stated definition, drying needs to be carried out for 60 minutes and calcination needs to be carried out for 60 minutes; that is, it takes 120 minutes or longer in total to determine the loss-on-ignition. Therefore, the determination of loss-on-ignition is a significant time burden for foundrymen. Furthermore, the operating conditions of the sand reclaimer and the mixing machine cannot be optimized according to the loss-on-ignition over a long time while carrying out measurement to determine the loss-on-ignition. This causes a decrease in quality of castings.

CITATION LIST

Japanese Patent Application Publication, Tokukai, No. 2015-208781

SUMMARY OF INVENTION

The present invention is to provide a technique that is capable of accurately estimating loss-on-ignition in a short time.

An apparatus configured to estimate loss-on-ignition in accordance with an aspect of the present invention includes at least one processor configured to carry out an estimation step. The estimation step includes estimating a loss-on-ignition of foundry sand with use of a learned model constructed by means of machine learning. A method of loss-on-ignition estimation in accordance with an aspect of the present invention includes an estimation step in which at least one processor estimates a loss-on-ignition of foundry sand with use of a learned model constructed by means of machine learning.

A machine-learning apparatus in accordance with an aspect of the present invention includes at least one processor configured to carry out a construction step. The construction step includes constructing, by means of supervised learning using a dataset-for-learning, a learned model configured to estimate a loss-on-ignition. A machine-learning method in accordance with an aspect of the present invention includes a construction step in which at least one processor constructs, by means of supervised learning using a dataset-for-learning, a learned model configured to estimate a loss-on-ignition.

The apparatus configured to estimate loss-on-ignition, the method of loss-on-ignition estimation, the machine-learning apparatus, and the machine-learning method are each configured such that: (a) the learned model is configured to receive, as input, (1) sand weight data relating to a weight of the foundry sand detected in a calcination period and (2) at least one of (i) sand property data relating to one or more properties of the foundry sand, (ii) additive data relating to one or more additives added to the foundry sand, and (iii) calcination environment data relating to a calcination environment detected in the calcination period; and (b) the learned model is configured to generate, as output, an estimated loss-on-ignition of the foundry sand or an estimated weight of the foundry sand after a predetermined period of calcination, the predetermined period being longer than the calcination period.

An apparatus and method for loss-on-ignition estimation in accordance with an aspect of the present invention make it possible to accurately estimate loss-on-ignition in a short time. A machine-learning apparatus and a machine-learning method in accordance with an aspect of the present invention make it possible to construct a learned model for use in such an apparatus and method for loss-on-ignition estimation.

DESCRIPTION OF EMBODIMENTS

[Loss-On-Ignition Estimation System]

Figure 1:
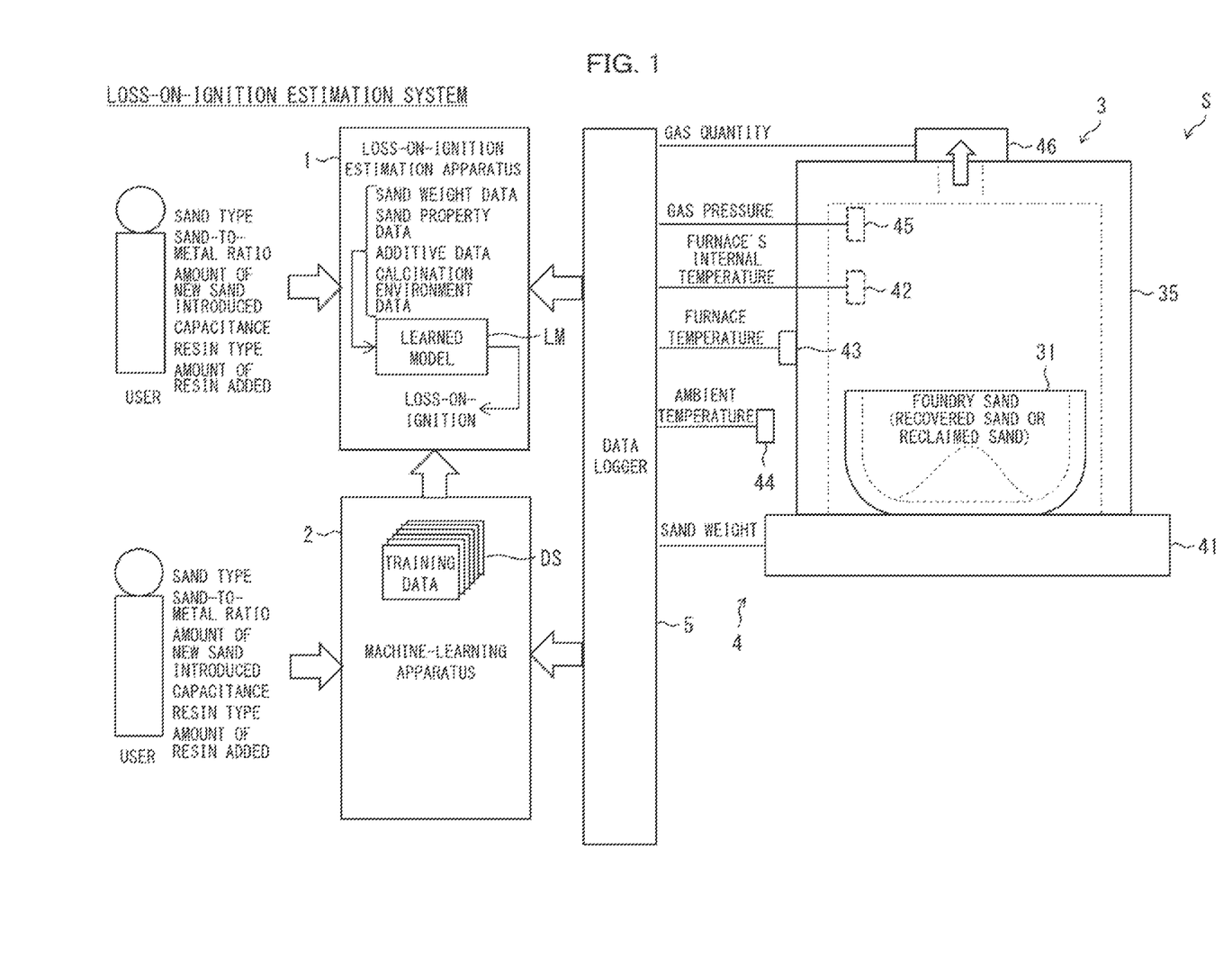
FIG. 1 illustrates a configuration of a loss-on-ignition estimation system in accordance with an aspect of the present invention.

The following description will discuss a loss-on-ignition estimation system S in accordance with an embodiment of the present invention with reference to FIG. 1. FIG. 1 illustrates a configuration of the loss-on-ignition estimation system S.

The loss-on-ignition estimation system S is configured to estimate the loss-on-ignition of recovered sand or reclaimed sand (recovered sand and reclaimed sand are hereinafter each referred to as "foundry sand", unless a particular distinction is required) generated in a casting cycle C (described later with reference to FIG. 6) that includes a casting phase C1 and a sand reclamation phase C2. As illustrated in FIG. 1, the loss-on-ignition estimation system S includes a loss-on-ignition estimation apparatus 1 (apparatus configured to estimate loss-on-ignition), a machine-learning apparatus 2, a calcining apparatus 3, a sensor group 4, and a data logger 5.

The calcining apparatus 3 is configured to calcine a small amount (for example, not less than 2 g and not more than 10 g) of foundry sand taken as a sample. As illustrated in FIG. 1, the calcining apparatus 3 includes a crucible 31 and a furnace 35.

The crucible 31 is configured to hold foundry sand. The furnace 35 is configured to heat the foundry sand held in the crucible 31. The furnace 35 controls the temperature inside the furnace 35 such that a drying step is carried out over a predetermined period of time (hereinafter "drying time", e.g., 60 minutes) and then a calcination step is carried out over a predetermined period of time (hereinafter "calcination time", e.g., 10 minutes). It is noted here that the drying step involves evaporating water contained in the foundry sand at a predetermined temperature (hereinafter "drying temperature", e.g., 100° C.). Also note that the calcination step involves burning combustible residues (residues resulted from a resin and a hardening agent added to the foundry sand) attached to grains of the foundry sand at a predetermined temperature (hereinafter "calcination temperature", e.g., 1000° C.). The calcination time is shorter than 60 minutes (calcination time employed in a conventional method of measuring loss-on-ignition). There is provided an elevating mechanism configured to raise and lower the crucible 31 (or the furnace 35). When introducing foundry sand or recovering foundry sand, the elevating mechanism lowers the crucible 31 (or raises the furnace 35) to cause the crucible 31 to be located outside the furnace 35. On the contrary, when heating foundry sand, the elevating mechanism raises the crucible 31 (or lowers the furnace 35) to cause the crucible 31 to be located inside the furnace 35.

The sensor group 4 includes an electronic balance 41, thermometers 42 to 44, a pressure gauge 45, and a flowmeter 46.

The electronic balance 41 is a sensor to measure the weight of foundry sand (such a weight is hereinafter referred to as "sand weight") held in the crucible 31. The thermometer 42 is a sensor to measure the temperature of a gas inside the furnace 35 (such a temperature is hereinafter referred to as "furnace's internal temperature"). The thermometer 43 is a sensor to measure the temperature of the outer wall of the furnace 35 (such a temperature is hereinafter referred to as "furnace temperature"). The thermometer 44 is a sensor to measure the temperature of the environment in which the calcining apparatus 3 is present (such a temperature is hereinafter referred to as "ambient temperature"). The pressure gauge is a sensor to measure the pressure of a gas inside the furnace 35 (such a pressure may be hereinafter referred to as "gas pressure"). The flowmeter 46 is a sensor to measure the flow rate of a gas discharged from the furnace 35 (such a flow rate is hereinafter referred to as "gas quantity"). Note that the gas inside the furnace 35 and the gas discharged from the furnace 35 are composed mainly of a gas resulting from vaporization of combustible residues.

The data logger 5 is a device configured to acquire output signals from the sensors of the sensor group 4 and provide the loss-on-ignition estimation apparatus 1 and the machine-learning apparatus 2 with data representing sand weight, furnace's internal temperature, furnace temperature, ambient temperature, gas pressure, and gas quantity. The data logger 5 can be composed of, for example, a programmable logic controller (PLC), an industrial PC (IPC), or the like.

The loss-on-ignition estimation apparatus 1 is configured to carry out a loss-on-ignition estimation method (method of loss-on-ignition estimation) M1. The loss-on-ignition estimation method M1 involves estimating loss-on-ignition from data provided from the data logger 5 and data inputted by an operator with use of a learned model LM constructed by means of machine learning. Examples of the learned model LM include algorithms such as neural network models (e.g., convolutional neural network and recurrent neural network), regression models (e.g., linear regression), and tree models (e.g., regression tree). A configuration of the loss-on-ignition estimation apparatus 1 and a flow of the loss-on-ignition estimation method M1 will be described later in detail with reference to different drawings.

The learned model LM is configured to receive, as input: sand weight data relating to the weight of foundry sand detected in a predetermined period from a first point in time at which the furnace's internal temperature reached a predetermined calcination temperature to a second point in time which is a predetermined calcination time after the first point in time (such a period may be hereinafter referred to as "calcination period"); sand property data relating to one or more properties of the foundry sand; additive data relating to one or more additives added to the foundry sand; and calcination environment data relating to a calcination environment detected in the calcination period. Note that examples of the additives include resins and hardening agents.

The sand weight data contains sand weight acquired from the electronic balance 41 via the data logger 5. The sand weight contained in the sand weight data may be an entire time series of sand weight detected in the calcination period or may be a value of sand weight detected at a specific point in time in the calcination period or values of sand weight detected at specific points in time included in the calcination period. In the present embodiment, sand weight detected at the point in time at which the calcination period started (such sand weight may be hereinafter referred to as "sand weight at the start of calcination") and sand weight detected at the point in time at which the calcination period ended (such sand weight may be hereinafter referred to as "sand weight at the end of calcination) are inputted to the learned model LM. Note that the sand weight at the start of calcination may be measured in the following manner: the crucible 31 is taken out of the furnace 35 after the drying step but before the calcination step. Also note that the sand weight at the end of calcination may be measured in the following manner: the crucible 31 is taken out of the furnace 35 after the calcination step.

The sand property data contains sand type, sand-to-metal ratio, amount of new sand introduced, and capacitance which have been inputted by an operator. As used herein, the term "sand type" refers to the type of foundry sand used in the casting cycle C. The sand type can be, for example, artificial sand, silica sand, chromite sand, zircon sand, a combination of any of such sand types, or the like. Note that the following configuration may be employed: in a case where the foundry sand used in the casting cycle C is a mixture of a plurality of sand types, an operator inputs the composition of the foundry sand to the loss-on-ignition estimation apparatus 1. The term "sand-to-metal ratio" refers to the ratio of the weight of a mold made in the casting cycle C to the weight of a casting which is made in the casting cycle C. The term "amount of new sand introduced" refers to the amount (which may be weight or volume) of new sand introduced into reclaimed sand in the casting cycle C per unit time (in a case of continuous process) or per batch (in a case of batch process). The term "capacitance" refers to the capacitance of foundry sand taken as a sample. Note that the capacitance of foundry sand can be measured by, for example, the method disclosed in Patent Literature 1.

The additive data contains resin type, amount of resin added, hardening agent type, and amount of hardening agent added which have been inputted by an operator. As used herein, the term "resin type" refers to the type of resin(s) added to foundry sand in the casting cycle C. The resin type can be, for example, furan, alkaline phenol, phenolic urethane, water glass, and/or the like. The term "amount of resin added" refers to the amount (which may be weight or volume) of resin(s) added to foundry sand in the casting cycle C per unit time (in a case of continuous process) or per batch (in a case of batch process). The term "hardening agent type" refers to the type of hardening agent(s) added, together with resin(s), to the foundry sand in the casting cycle C. The hardening agent type can be, for example, organic sulfonic acid, organic ester, and/or the like. The term "amount of hardening agent added" refers to the amount (which may be weight or volume) of hardening agent(s) added, together with resin(s), to the foundry sand in the casting cycle C per unit time (in a case of continuous process) or per batch (in a case of batch process).

The calcination environment data contains furnace's internal temperature, furnace temperature, ambient temperature, gas pressure, and gas quantity which have been acquired from the sensor group 4 via the data logger 5. Note, however, that the furnace's internal temperature inputted to the learned model LM may be an entire time series of furnace's internal temperature detected in the calcination period, the average of values of furnace's internal temperature detected in the calcination period, or a value of furnace's internal temperature detected at a specific point in time included in the calcination period or values of furnace's internal temperature detected at specific points in time included in the calcination period. In the present embodiment, the average of values of furnace's internal temperature (hereinafter may be referred to as "average furnace's internal temperature") is inputted to the learned model LM. The furnace temperature inputted to the learned model LM may be an entire time series of furnace temperature detected in the calcination period, the average of values of furnace temperature detected in the calcination period, or a value of furnace temperature detected at a specific point in time included in the calcination period or values of furnace temperature detected at specific points in time included in the calcination period. In the present embodiment, the average of values of furnace temperature (hereinafter may be referred to as "average furnace temperature") is inputted to the learned model LM. The ambient temperature inputted to the learned model LM may be an entire time series of ambient temperature detected in the calcination period, the average of values of ambient temperature detected in the calcination period, or a value of ambient temperature detected at a specific point in time included in the calcination period or values of ambient temperature detected at specific points in time included in the calcination period. In the present embodiment, the average of values of ambient temperature (hereinafter may be referred to as "average ambient temperature") is inputted to the learned model LM. The gas pressure inputted to the learned model LM may be an entire time series of gas pressure detected in the calcination period, the average of values of gas pressure detected in the calcination period, or a value of gas pressure detected at a specific point in time included in the calcination period or values of gas pressure detected at specific points in time included in the calcination period. In the present embodiment, the average of values of gas pressure (hereinafter may be referred to as "average gas pressure") is inputted to the learned model LM. The gas quantity inputted to the learned model LM may be an entire time series of gas quantity detected in the calcination period, the average of values of gas quantity detected in the calcination period, or a value of gas quantity detected at a specific point in time included in the calcination period or values of gas quantity detected at specific points in time included in the calcination period. In the present embodiment, the average of values of gas quantity (hereinafter may be referred to as "average gas quantity") is inputted to the learned model LM. The calcination environment data further contains the rate of temperature rise. The rate of temperature rise is calculated by the loss-on-ignition estimation apparatus 1 based on the furnace's internal temperature acquired from the sensor group 4 via the data logger 5. The rate of temperature rise is calculated using the following equation, for example: rate of temperature rise=(furnace's internal temperature at time at which calcination step started −furnace's internal temperature at time at which furnace started to operate)/(time at which calcination step started−time at which furnace started to operate).

The learned model LM is configured to generate loss-on-ignition as output. Loss-on-ignition is defined by $(W0-W60)/W0$, where $W0$ is the weight of dried but not calcined foundry sand, $W60$ is the weight of calcined foundry sand, and the calcination of the foundry sand here is carried out at a temperature of 1000° C. for 60 minutes. Determination of loss-on-ignition using this definition necessitates calcining foundry sand for 60 minutes or more; however, the use of the learned model LM makes it possible to estimate loss-on-ignition from sand weight data obtained by carrying out calcination for, for example, about 10 minutes, which is shorter than 60 minutes. Furthermore, there is a constant correlation between (i) the sand property data, additive data, and calcination environment data and (ii) loss-on-ignition. Therefore, with the use of the learned model LM configured to receive not only the sand weight data but also the sand property data, the additive data, and the calcination environment data as input, it is possible to accurately estimate loss-on-ignition in a short time.

The machine-learning apparatus 2 is configured to carry out a machine-learning method M2. The machine-learning method M2 involves: constructing a dataset-for-learning DS with use of data provided from the data logger 5 and data inputted by an operator; and constructing a learned model LM by means of machine learning (supervised learning) using the dataset-for-learning DS. A configuration of the machine-learning apparatus 2 and a flow of the machine-learning method M2 will be described later in detail with reference to different drawings.

The loss-on-ignition estimation system S proceeds through a preparatory phase and a trial phase and enters an actual use phase. The following description will roughly discuss what the preparatory phase, the trial phase, and the actual use phase are.

(1) Preparatory Phase

In the preparatory phase, an operator carries out 60-minute calcination to determine loss-on-ignition. Every time the operator carries out the determination of loss-on-ignition, the machine-learning apparatus 2 prepares training data from data provided from the data logger 5 and data inputted by the operator (including the loss-on-ignition calculated using the definition), and add the prepared training data to the dataset-for-learning DS. The preparatory phase may end upon passage of a certain period (for example, one week, one month, one year, or the like) from the start of the preparatory phase or may end when the number of times the determination of loss-on-ignition has been carried out in the preparatory phase has reached a certain number (for example, 100, 1000, 10000 or the like). Upon completion of the preparatory phase, the machine-learning apparatus 2 constructs a learned model LM by means of machine learning using the dataset-for-learning DS. The constructed learned model LM is transferred from the machine-learning apparatus 2 to the loss-on-ignition estimation apparatus 1.

(2) Trial Phase

In the trial phase, an operator carries out 60-minute calcination to determine loss-on-ignition, and the loss-on-ignition estimation apparatus 1 estimates loss-on-ignition. Every time the operator carries out the determination of loss-on-ignition, the loss-on-ignition estimation apparatus 1 estimates loss-on-ignition with use of the learned model LM based on data provided from the data logger 5 and data inputted by an operator. The trial phase may end upon passage of a certain period (for example, one week, one month, one year, or the like) from the start of the trial phase or may end when the number of times the determination of loss-on-ignition has been carried out in the trial phase has reached a certain number (for example, 100, 1000, 10000 or the like). Upon completion of the trial phase, the operator compares the values of the loss-on-ignition calculated using the definition and the values of the loss-on-ignition estimated by the loss-on-ignition estimation apparatus 1, and evaluates the accuracy of the estimation made by the loss-on-ignition estimation apparatus 1. In a case where the estimation is not accurate enough, the system returns to the preparatory phase. In a case where the estimation is accurate enough, the system proceeds to the actual use phase.

(3) Actual Use Phase

In the actual use phase, the loss-on-ignition estimation apparatus 1 estimates loss-on-ignition based on 10-minute calcination. The learned model LM used by the loss-on-ignition estimation apparatus 1 in the actual use phase has been confirmed in the trial phase to be capable of making accurate-enough estimation. In the actual use phase, it is not necessary to carry out 60-minute calcination to determine loss-on-ignition. This eliminates the need for the operator to take time to carry out 60-minute calcination to determine loss-on-ignition, and also makes it possible to run the casting cycle C efficiently.

Note that the present embodiment employs a configuration in which the learned model LM receives, as input, all of the following data: the sand weight data, the sand property data, the additive data, and the calcination environment data. However, the present invention is not limited to such. Out of these types of data, data which has a dominant influence on estimated loss-on-ignition is the sand weight data. The sand property data, the additive data, and the calcination environment data are used to improve the accuracy of estimation of loss-on-ignition, and the learned model does not need to receive all of them as input. That is, any configuration can be employed, provided that (1) the sand weight data and (2) at least one of (i) the sand property data, (ii) the additive data, and (iii) the calcination environment data are inputted to the learned model LM. The phrase "at least one of (i) the sand property data, (ii) the additive data, and (iii) the calcination environment data" herein means (a) a combination of these three types of data, (b) a combination of two types of data selected from the three types of data, or (c) one type of data selected from the three types of data.

The sand weight data does not necessarily need to contain sand weight at the start of calcination and sand weight at the end of calcination, provided that the sand weight data contains a value of sand weight detected at a specific point in time or values of sand weight detected specific points in time. For example, in a case where foundry sand used as a sample is constant in weight, the sand weight data may contain only sand weight at the end of calcination. The sand property data does not necessarily need to contain all of the following: the sand-to-metal ratio, the amount of new sand introduced, and the capacitance, provided that the sand property data contains at least part of such information. The additive data does not necessarily need to contain all of the following: the resin type, the amount of resin added, the hardening agent type, and the amount of hardening agent added, provided that the additive data contains at least part of such information. The calcination environment data does not necessarily need to contain all of the following: the furnace's internal temperature, the furnace temperature, the ambient temperature, the gas pressure, the gas quantity, and the rate of temperature rise, provided that the calcination environment data contains at least part of such information.

[Configuration of Loss-On-Ignition Estimation Apparatus]

Figure 2:
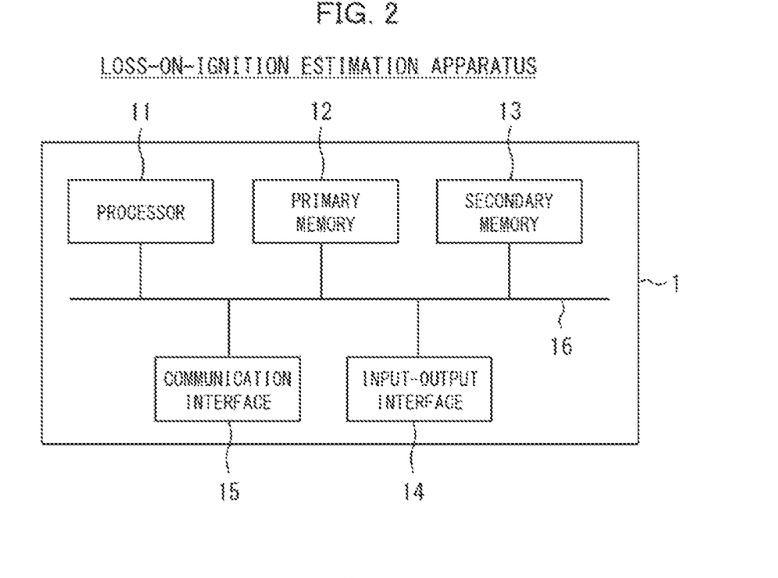
FIG. 2 is a block diagram illustrating a configuration of a loss-on-ignition estimation apparatus included in the loss-on-ignition estimation system of FIG. 1.

A configuration of the loss-on-ignition estimation apparatus 1 is discussed with reference to FIG. 2. FIG. 2 is a block diagram illustrating the configuration of the loss-on-ignition estimation apparatus 1.

The loss-on-ignition estimation apparatus 1 is realized by a general purpose computer, and includes a processor 11, a primary memory 12, a secondary memory 13, an input-output interface 14, a communication interface 15, and a bus 16. The processor 11, the primary memory 12, the secondary memory 13, the input-output interface 14, and the communication interface 15 are connected to one another through the bus 16.

The secondary memory 13 has a loss-on-ignition estimation program P1 and a learned model LM stored therein. The processor 11 reads the loss-on-ignition estimation program P1 and the learned model LM from the secondary memory 13 and load them into the primary memory 12. Then, the processor 11 carries out steps included in the loss-on-ignition estimation method M1 in accordance with instructions contained in the loss-on-ignition estimation program P1 loaded in the primary memory 12. The learned model LM loaded in the primary memory 12 is used when the processor 11 carries out an estimation step M12 (described later) of the loss-on-ignition estimation method M1. Note that the phrase "the secondary memory 13 has the loss-on-ignition estimation program P1 stored therein" means that a source code or an executable file obtained by compiling the source code is stored in the secondary memory 13. The phrase "the secondary memory 13 has the learned model LM stored therein" means that parameters defining the learned model LM are stored in the secondary memory 13.

A device that can be used as the processor 11 is, for example, a central processing unit (CPU), a graphic processing unit (GPU), a digital signal processor (DSP), a micro processing unit (MPU), a floating point number processing unit (FPU), a physics processing unit (PPU), a microcontroller, or a combination of any of those listed above. The processor 11 is also referred to as "arithmetic device".

A device that can be used as the primary memory 12 is, for example, a semiconductor random access memory (RAM). The primary memory 12 is also referred to as "main storage device". A device that can be used as the secondary memory 13 is, for example, a flash memory, a hard disk drive (HDD), a solid state drive (SSD), an optical disk drive (ODD), a floppy disk drive (FDD), or a combination of any of those listed above. The secondary memory 13 is also referred to as "auxiliary storage device". Note that the secondary memory 13 may be contained in the loss-on-ignition estimation apparatus 1 or may be contained in another computer (for example, a computer that constitutes a cloud server) that is connected to the loss-on-ignition estimation apparatus 1 through the input-output interface 14 or the communication interface 15. Note that, in the present embodiment, the memory of the loss-on-ignition estimation apparatus 1 is realized by two memories (the primary memory 12 and the secondary memory 13); however, this does not imply any limitation. That is, the memory of the loss-on-ignition estimation apparatus 1 may be realized by a single memory. In this case, for example, a certain storage area of the memory may be used as the primary memory 12 and another storage area of the memory may be used as the secondary memory 13.

The input-output interface 14 is configured to have input device(s) and/or output device(s) connected thereto. Examples of the input-output interface 14 include universal serial bus (USB), advanced technology attachment (ATA), small computer system interface (SCSI), and peripheral component interconnect (PCI) interfaces, and the like. The input device connected to the input-output interface 14 can be, for example, the data logger 5. Data acquired from the sensor group 4 in the loss-on-ignition estimation method M1 is inputted to the loss-on-ignition estimation apparatus 1 via the data logger 5, and stored in the primary memory 12. The input device connected to the input-output interface 14 can alternatively be, for example, a keyboard, a mouse, a touchpad, a microphone, or a combination of any of those listed above. Data acquired from an operator in the loss-on-ignition estimation method M1 is inputted to the loss-on-ignition estimation apparatus 1 via such input device(s) and stored in the primary memory 12. The output device connected to the input-output interface 14 can be, for example, a display, a projector, a printer, a speaker, a headphone, or a combination of any of those listed above. Information to be presented to the operator in the loss-on-ignition estimation method M1 is outputted from the loss-on-ignition estimation apparatus 1 via such output device(s). Note that the loss-on-ignition estimation apparatus 1 may contain a keyboard serving as an input device and a display serving as an output device, like a laptop computer. Alternatively, the loss-on-ignition estimation apparatus 1 may contain a touch panel that serves both as the input device and the output device, like a tablet computer.

The communication interface 15 is configured to have, connected thereto, another computer in a wired manner or wirelessly over a network. Examples of the communication interface 15 include Ethernet (registered trademark) and Wi-Fi (registered trademark) interfaces, and the like. Examples of the network that can be employed include personal area network (PAN), local area network (LAN), campus area network (CAN), metropolitan area network (MAN), wide area network (WAN), global area network (GAN), and an internetwork including any of such networks. The internetwork may be an intranet, an extranet, or the Internet. Data (for example, learned model LM) that the loss-on-ignition estimation apparatus 1 acquires from another computer (for example, machine-learning apparatus 2) in the loss-on-ignition estimation method M1, and data that the loss-on-ignition estimation apparatus 1 provides to another computer in the loss-on-ignition estimation method M1, are transmitted and received over such network(s).

Note that, although the present embodiment employs a configuration in which a single processor (processor 11) is used to carry out the loss-on-ignition estimation method M1, the present invention is not limited to such. That is, a configuration in which a plurality of processors are used to carry out the loss-on-ignition estimation method M1 may be employed. In this case, a plurality of processors which work together to carry out the loss-on-ignition estimation method M1 may be provided in a single computer and configured to be communicable with each other through a bus or may be provided in a respective plurality of computers and configured to be communicable with each other over a network. For example, the following configuration can be employed: a processor contained in a computer constituting a cloud server and a processor contained in a computer owned by a user of the cloud server work together to carry out the loss-on-ignition estimation method M1.

Although the present embodiment employs a configuration in which the learned model LM is stored in a memory (secondary memory 13) that is contained in the computer in which a processor (processor 11) that carries out the loss-on-ignition estimation method M1 is contained, the present invention is not limited to such. That is, the following configuration may be employed: the learned model LM is stored in a memory that is contained in a computer different from the computer in which the processor that carries out the loss-on-ignition estimation method M1 is contained. In this case, the computer in which the memory having the learned model LM stored therein is contained is configured to be communicable, over a network, with the computer in which the processor that carries out the loss-on-ignition estimation method M1 is contained. For example, the following configuration can be employed: the learned model LM is stored in a memory contained in a computer constituting a cloud server; and a processor contained in a computer owned by a user of the cloud server carries out the loss-on-ignition estimation method M1.

Although the present embodiment employs a configuration in which the learned model LM is stored in a single memory (secondary memory 13), the present invention is not limited to such. That is, the following configuration may be employed: the learned model LM is divided into a plurality of parts and stored in a respective plurality of memories. In this case, the plurality of memories in which the parts of the learned model LM are stored may be provided in a single computer (which may be or may not be the computer in which a processor that carries out the loss-on-ignition estimation method M1 is contained) or in a respective plurality of different computers (which may or may not include the computer in which a processor that carries out the loss-on-ignition estimation method M1 is contained). For example, the following configuration may be employed: the learned model LM is divided into a plurality of parts and stored in a respective plurality of memories contained in a respective plurality of computers constituting a cloud server.

[Flow of Loss-On-Ignition Estimation Method]

Figure 3:
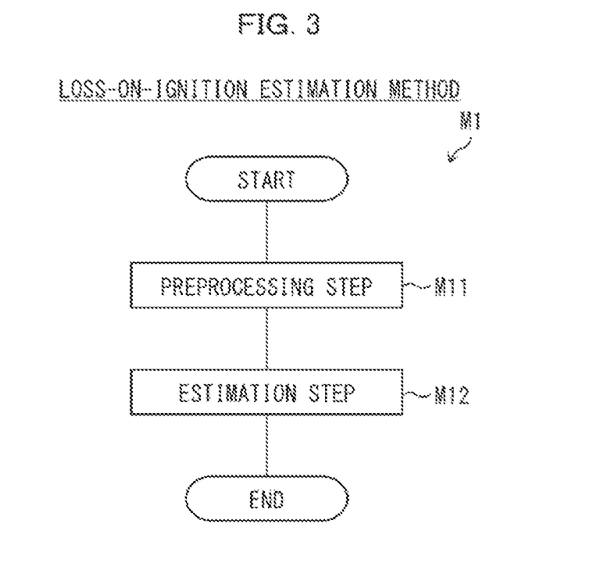
FIG. 3 is a flowchart illustrating a loss-on-ignition estimation method carried out by the loss-on-ignition estimation apparatus of FIG. 2.

The following description will discuss a flow of the loss-on-ignition estimation method M1 with reference to FIG. 3. FIG. 3 is a flowchart illustrating the loss-on-ignition estimation method M1.

The loss-on-ignition estimation method M1 includes a preprocessing step M11 and an estimation step M12.

The preprocessing step M11 is a step in which the processor 11 prepares data that is to be inputted to the learned model LM. In the preprocessing step M11, the processor 11 reads, from the primary memory 12, data provided from the data logger 5 and data inputted by an operator, and carries out the following processing.

(1) The processor 11 determines time t0 at which the furnace 35 started to operate, time t1 at which the furnace's internal temperature reached a predetermined calcination temperature T1 (for example, 1000° C.), and time t2 which is a predetermined calcination time Δt (for example, 10 minutes) after the time t1.

(2) The processor 11 determines sand weight indicated by the electronic balance 41 at the time t1 as being sand weight at the start of calcination, and determines sand weight indicated by the electronic balance 41 at the time t2 as being sand weight at the end of calcination.

(3) The processor 11 determines furnace's internal temperature T0 indicated by the thermometer 42 at the time to, and then carries out calculation using (T1−T0)/(t1−t0) to find the rate of temperature rise.

(4) The processor 11 acquires data of furnace's internal temperature, furnace temperature, ambient temperature, gas pressure, and gas quantity indicated by the thermometer 42, the thermometer 43, the thermometer 44, the pressure gauge 45, and the flowmeter 46, respectively, in a period from the time t1 to the time t2 (period during which calcination step is carried out). The processor 11 then calculates, from such data, the average internal temperature, average furnace temperature, average ambient temperature, average gas pressure, and average gas quantity.

(5) The processor 11 writes, into the primary memory 12, the sand weight at the start of calcination, the sand weight at the end of calcination, the rate of temperature rise, the average furnace's internal temperature, the average furnace temperature, the average ambient temperature, the average gas pressure, and the average gas quantity which have been determined or calculated through the foregoing processing.

The estimation step M12 is a step in which the processor 11 estimates loss-on-ignition with use of the learned model LM. In the estimation step M12, the processor 11 reads sand weight data, sand property data, additive data, and calcination environment data from the primary memory 12, and inputs them to the learned model LM. The processor 11 then writes, into the primary memory 12, the estimated loss-on-ignition outputted from the learned model LM.

As described earlier, the sand weight data contains sand weight at the start of calcination and sand weight at the end of calcination. The sand property data contains sand weight at the start of calcination, sand weight at the end of calci- nation, sand type, sand-to-metal ratio, amount of new sand introduced, and capacitance. The additive data contains resin type, amount of resin added, hardening agent type, and amount of hardening agent added. The calcination environment data contains furnace's internal temperature, furnace temperature, ambient temperature, gas pressure, gas quantity, and rate of temperature rise. Furthermore, as described earlier, the learned model LM generates, as output, an estimated value of loss-on-ignition defined by (W0−W60)/W0, where W0 is the weight of dried but not calcined foundry sand and W60 is the weight of calcined foundry sand, in which the calcination is carried out at 1000° C. for 60 minutes.

Note that the learned model LM may be configured to output estimated sand weight after 60 minutes (which is an example of "predetermined period" in the claims) from the start of calcination (this sand weight is the above-mentioned "W60"), instead of outputting the estimated loss-on-ignition. In this case, in the estimation step M12, the processor 11 calculates estimated loss-on-ignition by substituting the sand weight W0 at the start of calcination and the sand weight W60 outputted from the learned model LM into the expression (W0−W60)/W0.

The loss-on-ignition estimation method M1 may further include an output step involving outputting the loss-on-ignition estimated in the estimation step M12. In the output step, the processor 11 outputs the estimated loss-on-ignition to a display to present the loss-on-ignition to an operator that controls the casting cycle C. This allows the operator to optimize a sand conditioning cycle in accordance with the loss-on-ignition of recovered sand or reclaimed sand. Alternatively, the processor 11 provides the estimated loss-on-ignition to a line controller that controls the casting cycle C. This allows the line controller to optimize the casting cycle C in accordance with the loss-on-ignition of recovered sand or reclaimed sand.

The loss-on-ignition estimation method M1 may further include a condition setting step (corresponding to condition setting step C32 described later) that involves setting, in accordance with the loss-on-ignition estimated in the estimation step M12, condition(s) in which step(s) of the casting cycle C is/are carried out. In the condition setting step, for example, the processor 11 sets conditions in which a sand reclamation step C24 (described later) is carried out so that the conditions are appropriate for the loss-on-ignition estimated in the estimation step M12. Alternatively, the processor 11 sets conditions in which a new sand introducing step C26 (described later) is carried out so that the conditions are appropriate for the loss-on-ignition estimated in the estimation step M12. Alternatively, the processor 11 sets conditions in which a mixing step C11 (described later) is carried out so that the conditions are appropriate for the loss-on-ignition estimated in the estimation step M12. As such, the optimization of the casting cycle C, in accordance with the loss-on-ignition of recovered sand or reclaimed sand, can also be achieved by causing the processor 11 to carry out the condition setting step.

[Configuration of Machine-Learning Apparatus]

Figure 4:
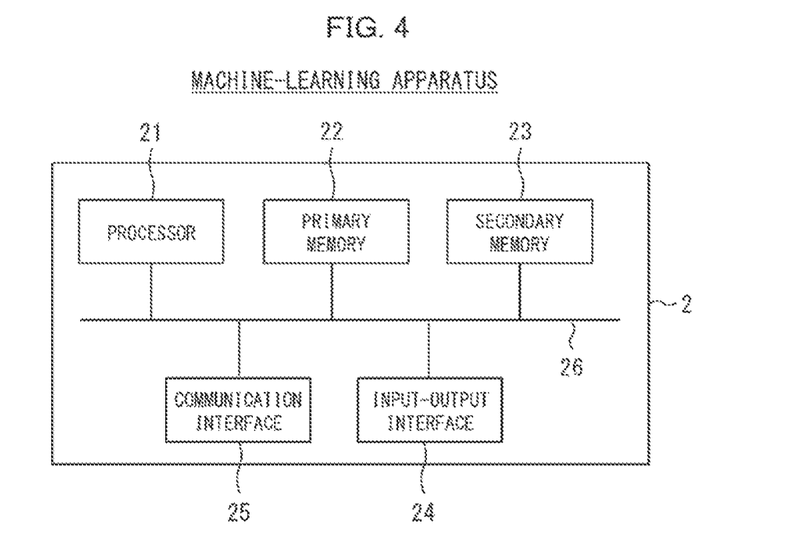
FIG. 4 is a block diagram illustrating a configuration of a machine-learning apparatus included in the loss-on-ignition estimation system of FIG. 1.

The following description will discuss a configuration of the machine-learning apparatus 2 with reference to FIG. 4. FIG. 4 is a block diagram illustrating the configuration of the machine-learning apparatus 2.

The machine-learning apparatus 2 is realized by a general purpose computer, and includes a processor 21, a primary memory 22, a secondary memory 23, an input-output interface 24, a communication interface 25, and a bus 26. The processor 21, the primary memory 22, the secondary memory 23, the input-output interface 24, and the communication interface 25 are connected to one another through the bus 26.

The secondary memory 23 has a machine-learning program P2 and a dataset-for-learning DS stored therein. The dataset-for-learning DS is a set of training data DS1, training data DS2, . . . and so on. The processor 21 reads the machine-learning program P2 from the secondary memory 23 and loads it into the primary memory 22. Then, the processor 21 carries out steps included in the machine-learning method M2 in accordance with instructions contained in the machine-learning program P2 loaded in the primary memory 22. The dataset-for-learning DS stored in the secondary memory 23 is constructed in a step M21 of constructing dataset for learning (described later) of the machine-learning method M2, and used in a step M22 of constructing learned model (described later) of the machine-learning method M2. The learned model LM constructed in the step M22 of constructing learned model of the machine-learning method M2 is also stored in the secondary memory 23. Note that the phrase "the secondary memory 23 has the machine-learning program P2 stored therein" means that a source code or an executable file obtained by compiling the source code is stored in the secondary memory 23. The phrase "the secondary memory 23 has the learned model LM stored therein" means that parameters defining the learned model LM are stored in the secondary memory 23.

A device that can be used as the processor 21 is, for example, a central processing unit (CPU), a graphic processing unit (GPU), a digital signal processor (DSP), a micro processing unit (MPU), a floating point number processing unit (FPU), a physics processing unit (PPU), a microcontroller, or a combination of any of those listed above. The processor 21 is also referred to as "arithmetic device".

A device that can be used as the primary memory 22 is, for example, a semiconductor random access memory (RAM). The primary memory 22 is also referred to as "main storage device". A device that can be used as the secondary memory 23 is, for example, a flash memory, a hard disk drive (HDD), a solid state drive (SSD), an optical disk drive (ODD), a floppy disk drive (FDD), or a combination of any of those listed above. The secondary memory 23 is also referred to as "auxiliary storage device". Note that the secondary memory 23 may be contained in the machine-learning apparatus 2 or may be contained in another computer (for example, a computer that constitutes a cloud server) that is connected to the machine-learning apparatus 2 through the input-output interface 24 or the communication interface 25. Note that, in the present embodiment, the memory of the machine-learning apparatus 2 is realized by two memories (the primary memory 22 and the secondary memory 23); however, this does not imply any limitation. That is, the memory of the machine-learning apparatus 2 may be realized by a single memory. In this case, for example, a certain storage area of the memory may be used as the primary memory 22 and another storage area of the memory may be used as the secondary memory 23.

The input-output interface 24 is configured to have input device(s) and/or output device(s) connected thereto. Examples of the input-output interface 24 include universal serial bus (USB), advanced technology attachment (ATA), small computer system interface (SCSI), and peripheral component interconnect (PCI) interfaces, and the like. The input device connected to the input-output interface 24 can be, for example, the data logger 5. Data acquired from the sensor group 4 in the machine-learning method M2 is inputted to the machine-learning apparatus 2 via the data logger 5, and stored in the primary memory 22. The input device connected to the input-output interface 24 can alternatively be, for example, a keyboard, a mouse, a touchpad, a microphone, or a combination of any of those listed above. Data acquired from an operator in the machine-learning method M2 is inputted to the machine-learning apparatus 2 via such input device(s) and stored in the primary memory 22. The output device connected to the input-output interface 24 can be, for example, a display, a projector, a printer, a speaker, a headphone, or a combination of any of those listed above. Information to be presented to the operator in the machine-learning method M2 is outputted from the machine-learning apparatus 2 via such output device(s). Note that the machine-learning apparatus 2 may contain a keyboard serving as an input device and a display serving as an output device, like a laptop computer. Alternatively, the machine-learning apparatus 2 may contain a touch panel that serves both as the input device and the output device, like a tablet computer.

The communication interface 25 is configured to have, connected thereto, another computer in a wire manner or wirelessly over a network. Examples of the communication interface 25 include Ethernet (registered trademark) and Wi-Fi (registered trademark) interfaces, and the like. Examples of the network that can be employed include personal area network (PAN), local area network (LAN), campus area network (CAN), metropolitan area network (MAN), wide area network (WAN), global area network (GAN), and an internetwork including any of such networks. The internetwork may be an intranet, an extranet, or the Internet. Data (for example, learned model LM) that the machine-learning apparatus 2 presents to another computer (for example, loss-on-ignition estimation apparatus 1) is transmitted and received over such network(s).

Note that, although the present embodiment employs a configuration in which a single processor (processor 21) is used to carry out the machine-learning method M2, the present invention is not limited to such. That is, a configuration in which a plurality of processors are used to carry out the machine-learning method M2 may be employed. In this case, a plurality of processors which work together to carry out the machine-learning method M2 may be provided in a single computer and configured to be communicable with each other through a bus or may be provided in a respective plurality of computers and configured to be communicable with each other over a network. For example, the following configuration can be employed: a processor contained in a computer constituting a cloud server and a processor contained in a computer owned by a user of the cloud server work together to carry out the machine-learning method M2.

Although the present embodiment employs a configuration in which the dataset-for-learning DS is stored in a memory (secondary memory 23) that is contained in the computer in which a processor (processor 21) that carries out the machine-learning method M2 is contained, the present invention is not limited to such. That is, the following configuration may be employed: the dataset-for-learning DS is stored in a memory that is contained in a computer different from the computer in which the processor that carries out the machine-learning method M2 is contained. In this case, the computer in which the memory having the dataset-for-learning DS stored therein is contained is configured to be communicable, over a network, with the computer in which the processor that carries out the machine-learning method M2 is contained. For example, the following configuration can be employed: the dataset-for-learning DS is stored in a memory contained in a computer constituting a cloud server; and a processor contained in a computer owned by a user of the cloud server carries out the machine-learning method M2.

Although the present embodiment employs a configuration in which the dataset-for-learning DS is stored in a single memory (secondary memory 23), the present invention is not limited to such. That is, the following configuration may be employed: the dataset-for-learning DS is divided into a plurality of parts and stored in a respective plurality of memories. In this case, the plurality of memories in which the parts of the dataset-for-learning DS are stored may be provided in a single computer (which may be or may not be the computer in which a processor that carries out the machine-learning method M2 is contained) or in a respective plurality of different computers (which may or may not include the computer in which a processor that carries out the machine-learning method M2 is contained). For example, the following configuration may be employed: the dataset-for-learning DS is divided into a plurality of parts and stored in a respective plurality of memories contained in a respective plurality of computers constituting a cloud server.

Although the present embodiment employs a configuration in which different processors (processor 11 and processor 21) are used to carry out the loss-on-ignition estimation method M1 and the machine-learning method M2, the present invention is not limited to such. That is, a single processor may be used to carry out the loss-on-ignition estimation method M1 and the machine-learning method M2. In this case, the processor carries out the machine-learning method M2, and thereby the learned model LM is stored in a memory that is contained in the same computer as the processor. The processor will use the learned model LM stored in this memory when carrying out the loss-on-ignition estimation method M1.

[Flow of Machine-Learning Method]

Figure 5:
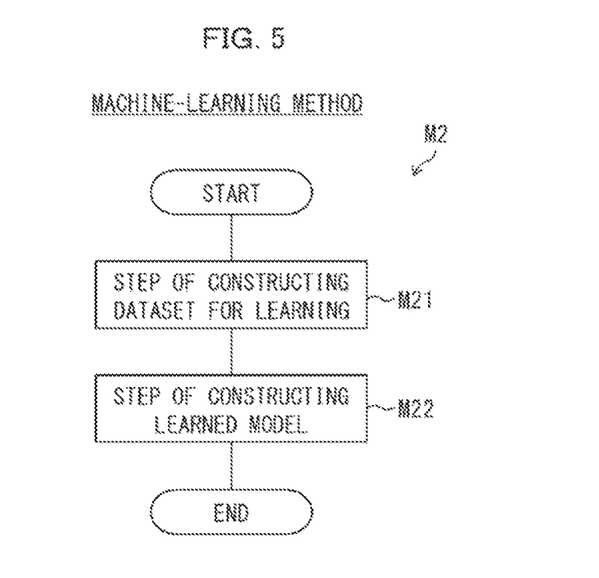
FIG. 5 is a flowchart illustrating a machine-learning method carried out by the machine-learning apparatus of FIG. 4.

The following description will discuss a flow of the machine-learning method M2 with reference to FIG. 5. FIG. is a flowchart illustrating the machine-learning method M2.

The machine-learning method M2 includes a step M21 of constructing dataset for learning and a step M22 of constructing learned model.

The step M21 of constructing dataset for leaning is a step in which the processor 21 constructs a dataset-for-learning DS which is a set of training data DS1, training data DS2, . . . and so on.

Each training data DSi (i=1, 2, . . . and so on) contains sand weight data, sand property data, additive data, and calcination environment data. The sand weight data, sand property data, additive data, and calcination environment data contained in the training data DSi are the same in type as sand weight data, sand property data, additive data, and calcination environment data which are to be inputted to the learned model LM. In the step M21 of constructing dataset for learning, the processor 21 acquires such data in the same manner as the loss-on-ignition estimation apparatus 1. The training data DSi also contains, as a label, loss-on-ignition defined by $(W0-W60)/W0$, where $W0$ is the weight of dried but not calcined foundry sand and $W60$ is the weight of calcined foundry sand, in which the calcination is carried out at 1000° C. for 60 minutes. In the step M21 of constructing dataset for learning, the processor 21 calculates the loss-on-ignition (1) using, as $W0$, sand weight detected at the start of calcination, (2) using, as $W60$, sand weight detected at the point in time after 60 minutes from the start of calcination, and (3) using the expression "$(W0-W60)/W0$". The processor 21 then causes the secondary memory 23 to store the acquired sand weight data, sand property data, additive data, and calcination environment data and the calculated loss-on-ignition such that the acquired sand weight data, sand property data, additive data, and calcination environment data are associated with the calculated loss-on-ignition. The processor 21 repeats the above-described process to construct the dataset-for-learning DS.

The step M22 of constructing learned model is a step in which the processor 21 constructs the learned model LM. In the step M22 of constructing learned model, the processor 21 constructs the learned model LM by means of supervised learning using the dataset-for-learning DS. The processor 21 then causes the secondary memory 23 to store the constructed learned model LM.

[Flow of Casting Cycle]

Figure 6:
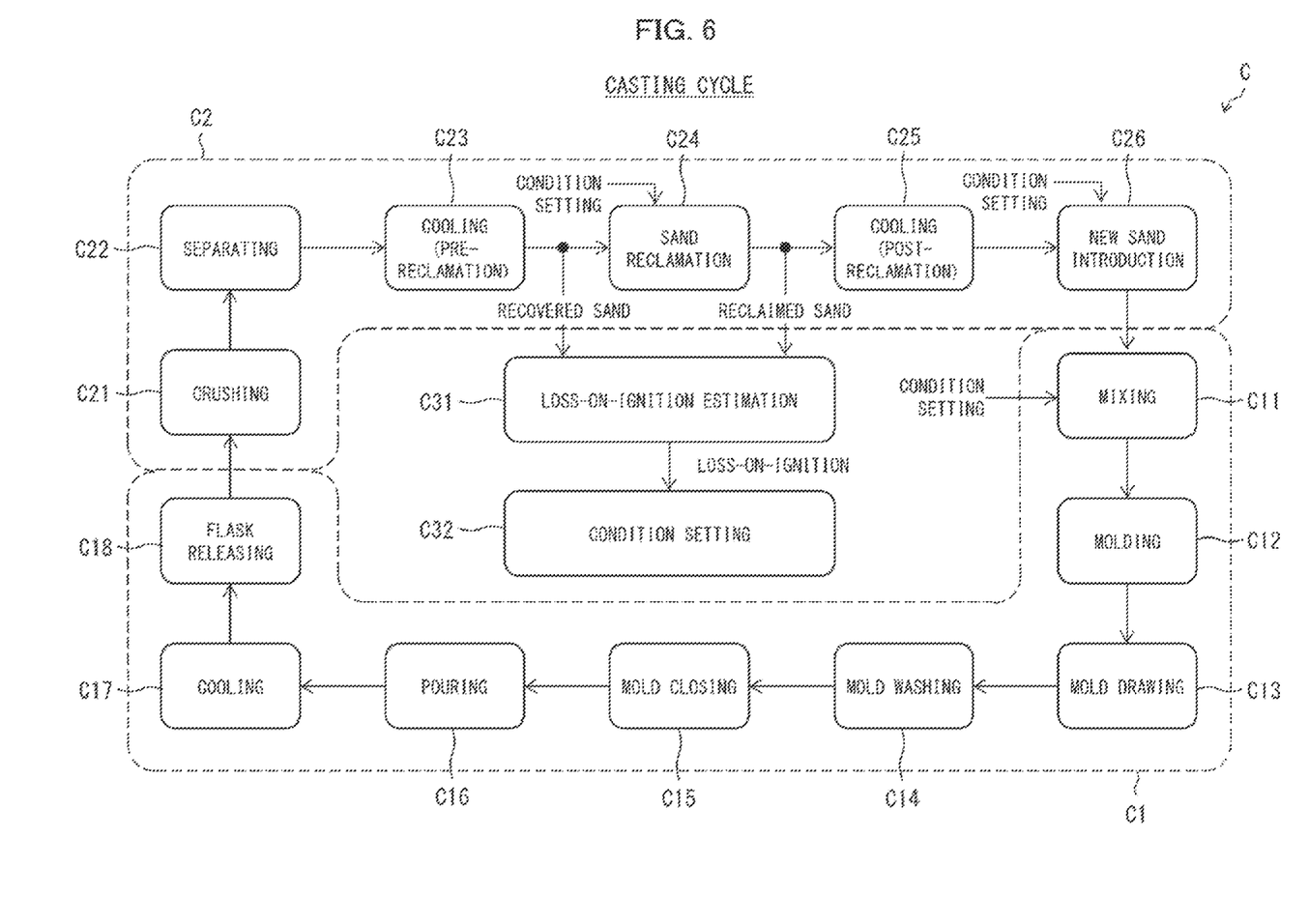
FIG. 6 is a flowchart illustrating a sand conditioning cycle to which the loss-on-ignition estimation system of FIG. 1 is applied.

The following description will discuss a flow of a casting cycle C to which the loss-on-ignition estimation system S is applied, with reference to FIG. 6. FIG. 6 is a flowchart illustrating the casting cycle C.

As shown in FIG. 6, the casting cycle C includes a casting phase C1 and a sand reclamation phase C2.

The casting phase C1 involves carrying out casting using foundry sand reclaimed through the sand reclamation phase C2 (such foundry sand is a mixture of reclaimed sand and new sand, described later). The casting phase C1 can be comprised of, for example, as shown in FIG. 6, a mixing step C11, a molding step C12, a mold drawing step C13, a mold washing step C14, a mold closing step C15, a pouring step C16, a cooling step C17, and a flask releasing step C18.

The mixing step C11 involves adding additives including a resin and a hardening agent to the foundry sand reclaimed through the sand reclamation phase C2 and carrying out mixing. The molding step C12 involves making a mold by filling a flask with the foundry sand obtained through mixing in the mixing step C11. In the molding step C12, an upper mold that corresponds to an upper part of the mold and a lower mold that corresponds to a lower part of the mold are made. The mold drawing step C13 involves removing the upper and lower molds made in the molding step C12 from the flask. The mold washing step C14 involves applying a mold wash to the surfaces, facing the product, of the upper and lower molds removed in the mold drawing step C13. The mold closing step C15 involves obtaining a mold by combining the upper and lower molds which had the mold wash applied in the mold washing step C14. The pouring step C16 involves pouring a molten metal into the mold obtained in the mold closing step C15. The cooling step C17 involves cooling the molten metal poured into the mold in the pouring step C16. The cooled molten metal solidifies within the mold to become a casting. The flask releasing step C18 involves: breaking down the mold into sand masses by applying vibration to the mold; and removing the casting obtained in the cooling step C17.

The sand reclamation phase C2 involves reclaiming foundry sand from the sand masses obtained in the casting phase C1. The sand reclamation phase C2 can be comprised of, for example, as shown in FIG. 6, a crushing step C21, a separating step C22, a pre-reclamation cooling step C23, a sand reclamation step C24, a post-reclamation cooling step C25, and a new sand introducing step C26.

The crushing step C21 involves crushing the sand masses obtained in the casting phase C1 into sand grains by applying vibration to the sand masses. The sand grains obtained in the crushing step C21 contain not only the grains of foundry sand to be reclaimed but also particles other than the foundry sand such as iron pieces and debris. The surfaces of the grains of foundry sand to be reclaimed have combustible residues such as a resin attached thereon. The separating step C22 involves separating particles other than the foundry sand from the sand grains obtained in the crushing step C21. The foundry sand obtained in the separating step C22, that is, foundry sand from which the combustible residues attached on the surfaces of the sand grains have not yet been removed, may be hereinafter referred to as "recovered sand". The pre-reclamation cooling step C23 involves cooling the recovered sand obtained in the separating step C22. The sand reclamation step C24 involves removing the combustible residues from the grains of the recovered sand cooled in the pre-reclamation cooling step C23. The foundry sand obtained in the sand reclamation step C24, that is, foundry sand from which the combustible residues on the surfaces have been removed, may be hereinafter referred to as "reclaimed sand". The post-reclamation cooling step C25 involves cooling the reclaimed sand obtained in the sand reclamation step C24. The new sand introducing step C26 involves adding new sand, that is, unused foundry sand, to the reclaimed sand obtained in the sand reclamation step C24. A mixture of the reclaimed sand and the new sand obtained in the new sand introducing step C26 is used as foundry sand in the subsequent casting phase C1.

In order to maintain the quality of foundry sand for use in the casting phase C1, it is necessary to appropriately set the condition(s) in which the sand reclamation step C24 is carried out (hereinafter may be referred to as "reclamation condition(s)"), the condition(s) in which the new sand introducing step C26 is carried out (hereinafter may be referred to as "new sand introduction condition(s)"), and the condition(s) in which the mixing step C11 is carried out (hereinafter may be referred to as "mixing condition(s)"). The new sand introduction condition(s) can include, for example, the amount of new sand introduced in the new sand introducing step C26. Note that the reclamation condition(s) and the mixing condition(s) will be described later with reference to a different drawing.

In view of the above, in the casting cycle C, the above-stated conditions are set based on the loss-on-ignition of recovered sand and/or reclaimed sand. To achieve this, the casting cycle C includes: a loss-on-ignition estimation step C31 involving estimating the loss-on-ignition of recovered sand and/or reclaimed sand; and a condition setting step C32 involving setting at least one of (i) the reclamation conditions, (ii) the new sand introduction conditions, and (iii) the mixing conditions on the basis of the loss-on-ignition estimated in the loss-on-ignition estimation step C31. The loss-on-ignition estimation step C31 is carried out by the loss-on-ignition estimation apparatus 1, as described earlier. The condition setting step C32 may be carried out by the loss-on-ignition estimation apparatus 1, by an operator who has obtained the loss-on-ignition from the loss-on-ignition estimation apparatus 1, or by a line controller which has acquired the loss-on-ignition from the loss-on-ignition estimation apparatus 1, as described earlier. Specific examples of the condition setting step C32 are as follows.

A first specific example is feedforward condition setting by which the reclamation condition(s) is/are set in accordance with the loss-on-ignition of recovered sand. A second specific example is feedback condition setting by which the reclamation condition(s) is/are set in accordance with the loss-on-ignition of reclaimed sand. A third specific example is a combination of feedback condition setting and feedforward condition setting by which the reclamation condition(s) is/are set in accordance with both the loss-on-ignition of recovered sand and the loss-on-ignition of reclaimed sand. The third specific example includes, for example, an aspect in which the reclamation condition(s) is/are set in accordance with the weighted average of the loss-on-ignition of recovered sand and the loss-on-ignition of reclaimed sand. A fourth specific example is feedforward condition setting by which the mixing condition(s) is/are set in accordance with the loss-on-ignition of reclaimed sand. Note that the setting of the mixing condition(s) may be carried out when the strength of the mold made in the molding step C12 is outside a predetermined control range. A fifth specific example is condition setting by which the new sand introduction condition(s) is/are set in accordance with the loss-on-ignition of reclaimed sand.

Note that, in the loss-on-ignition estimation step C31, (1) only the loss-on-ignition of recovered sand may be estimated, (2) only the loss-on-ignition of reclaimed sand may be estimated, or (3) both the loss-on-ignition of recovered sand and the loss-on-ignition of reclaimed sand may be estimated. In the case (1), the foregoing condition setting step C32 in accordance with the first specific example can be employed. In the case (2), a portion of or all of the foregoing condition setting steps C32 in accordance with the second, fourth, and fifth specific example can be employed. In the case (3), a portion of or all of the foregoing condition setting steps C32 in accordance with the third, fourth, and fifth specific example can be employed.

[Specific Examples of Reclamation Conditions and Setting of Reclamation Conditions]

In a case where the sand reclamation step C24 is carried out with use of a sand reclaimer, the reclamation conditions can be rephrased as conditions in which the sand reclaimer operates. The sand reclaimer can be, for example, a sand reclaimer 7 illustrated in FIG. 7.

Figure 7:
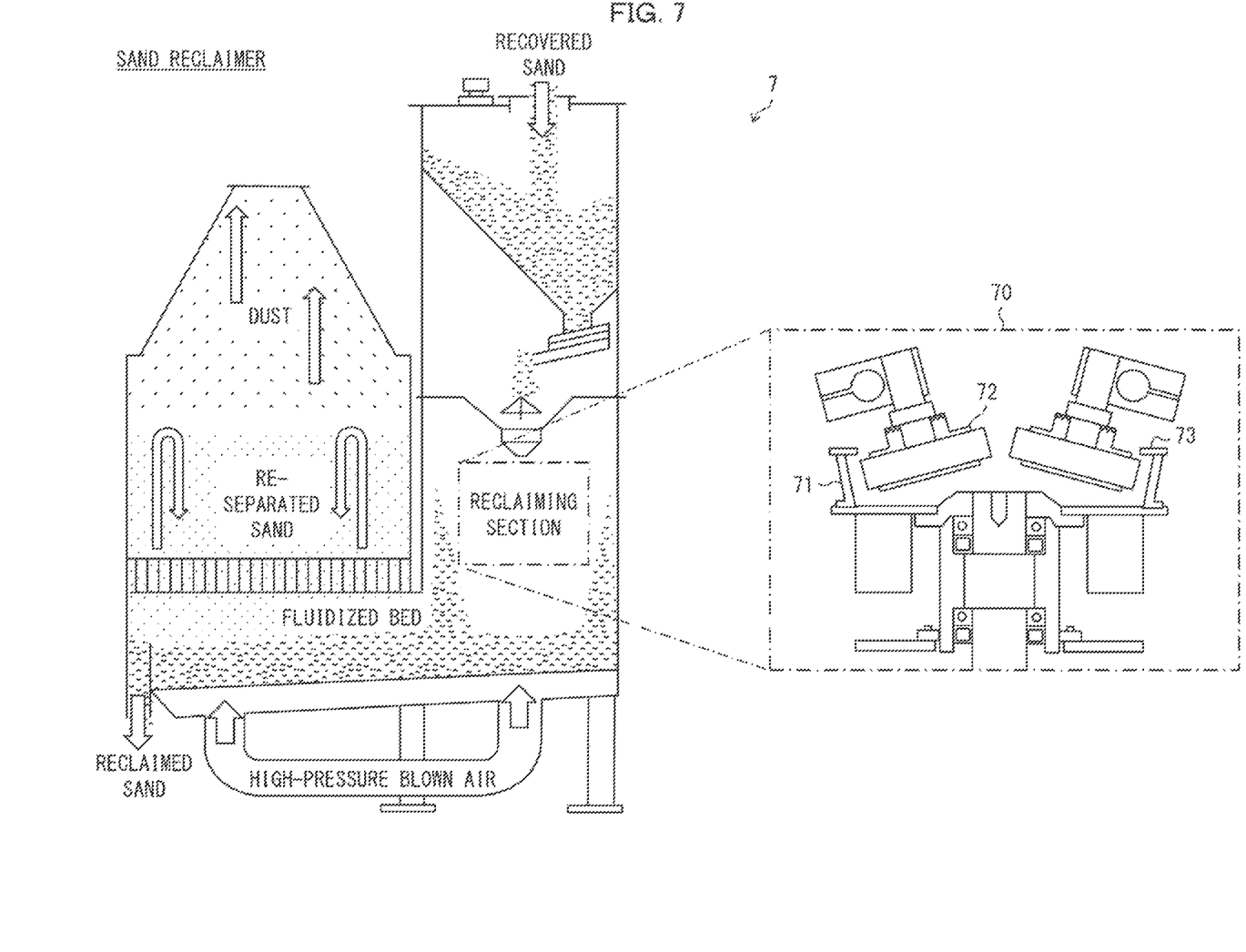
FIG. 7 illustrates a specific example of a sand reclaimer which carries out a sand reclamation step included in the sand conditioning cycle of FIG. 6.

As illustrated in FIG. 7, the sand reclaimer 7 includes a reclaiming section 70. The reclaiming section 70 includes a rotary drum 71 and at least one pressure roller 72 which is pressed against the inner surface of the side wall of the rotary drum 71. When recovered sand is introduced and the rotary drum 71 is rotated, grains of the recovered sand flying due to centrifugal force are ground and polished between the side wall of the rotary drum 71 and the pressure roller 72, and combustible residues are removed. The rotary drum 71 has, at the top thereof, a flange 73 called an orifice projecting inward. It is possible to keep the grains of the introduced recovered sand within the rotary drum 71 for a long time by configuring the flange 73 to project greatly.

In a case where the sand reclamation step C24 is carried out with use of the sand reclaimer 7, the reclamation conditions include the amount of recovered sand introduced, the number of rotations, the pressure applied by the roller, and the amount of projection of the flange. In a case where the sand reclaimer 7 carries out sand reclamation batchwise, the time for which sand reclamation is carried out is also included in the reclamation conditions. The definition for the respective reclamation conditions and an overview of the condition setting step C32 for each reclamation condition are shown in the following table. Note that the highest-priority reclamation condition is the pressure applied by the roller. In a case where changing only the pressure applied by the roller is sufficient to optimize the operation of the sand reclaimer 7, setting of the other reclamation conditions may be omitted. The lowest-priority reclamation condition is the amount of recovered sand introduced. Setting of the amount of recovered sand introduced may be carried out only in a case where changes of other reclamation conditions are not sufficient to optimize the operation of the sand reclaimer 7.

TABLE 1

| Reclamation conditions | Definition | Overview of condition setting step |
|---|---|---|
| Amount of recovered sand introduced | The amount of recovered sand introduced per unit time (in a case of continuous process) or per batch (in a case of batch process) | Reduce the amount of recovered sand introduced as loss-on-ignition of recovered sand and/or loss-on-ignition of reclaimed sand increases |
| Number of rotations | The number of rotations of rotary drum 71 per unit time | Increase the number of rotations as loss-on-ignition of recovered sand and/or loss-on-ignition of reclaimed sand increases |
| Pressure applied by roller | The force applied by pressure roller 72 to inner surface of rotary drum 71 | Increase pressure applied by roller as loss-on-ignition of recovered sand and/or loss-on-ignition of reclaimed sand increases |
| Amount of projection of flange | Amount of projection of flange 73 | Increase the amount of projection of flange as loss-on-ignition of recovered sand and/or loss-on-ignition of reclaimed sand increases |
| Time for which sand reclamation is carried out (batch process) | Time for which rotary drum 71 is rotated (time for which sand reclamation is carried out) | Increase the time for which sand reclamation is carried out as loss-on-ignition of recovered sand and/or loss-on-ignition of reclaimed sand increases |

Note that, in the sand reclamation step C24, removal of combustible residues by calcination may be carried out in addition to or instead of the foregoing removal of combustible residues by polishing. In this case, the calcination temperature and the calcination time are also examples of reclamation conditions. The definitions for the respective reclamation conditions and an overview of the condition setting step C32 for each reclamation condition are shown in the following table. Note that whether or not to carry out the setting of the calcination temperature is determined preferably in accordance with the type of resin added to foundry sand. For example, in a case where the resin added to the foundry sand is water glass, it is preferable that the setting of the calcination temperature be omitted.

TABLE 2

| Reclamation conditions | Definition | Overview of condition setting step |
|---|---|---|
| Calcination temperature | Furnace temperature or furnace's internal temperature when recovered sand is calcined | Raise calcination temperature as loss-on-ignition of recovered sand and/or loss-on-ignition of reclaimed sand increases |
| Calcination time | Time for which recovered sand is calcined at a predetermined calcination temperature (e.g., 1000° C.) | Increase calcination time as loss-on-ignition of recovered sand and/or loss-on-ignition of reclaimed sand increases |

[Specific Examples of Mixing Conditions and Setting of Mixing Condition]

In a case where the mixing step C11 is carried out with use of a mixing machine, mixing conditions can be rephrased as conditions in which the mixing machine operates. The mixing machine can be, for example, a mixing machine 8 illustrated in FIG. 8.

Figure 8:
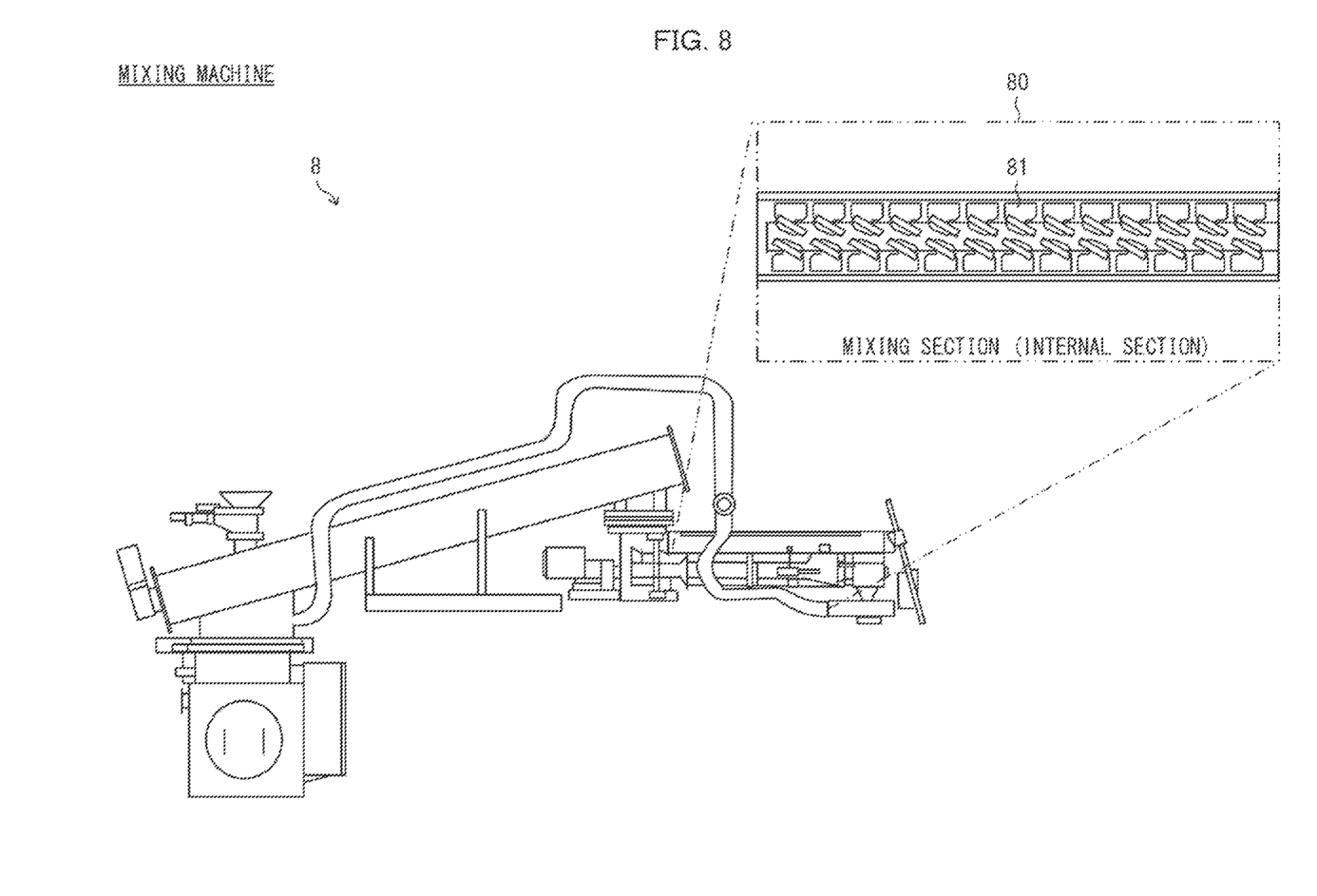
FIG. 8 illustrates a specific example of a mixing machine which carries out a mixing step included in the sand conditioning cycle of FIG. 6.

As illustrated in FIG. 8, the mixing machine 8 includes a mixing section 80 which includes mixing blades 81. By introducing foundry sand and additives (resin and hardening agent) into the mixing section 80 and rotating the mixing blade 81, self-hardening foundry sand can be generated. In a case where the mixing step C11 is carried out with use of the mixing machine 8, the mixing conditions include the amounts of additives (the amount of resin added and the amount of hardening agent added), the number of rotations of mixing blades, and the amount of mixed sand to be conditioned. The definitions for the respective mixing conditions and an overview of the condition setting step C32 for each mixing condition are shown in the following table. Note that a change in the amount of mixed sand to be conditioned results in an increase or decrease in amount of resulting reclaimed sand. Therefore, the setting of the amount of mixed sand to be conditioned is preferably omitted in a case where changes of other mixing conditions are sufficient to optimize the operation of the mixing machine 8.

TABLE 3

| Mixing conditions | Definition | Overview of condition setting step |
|---|---|---|
| Amounts of additives | The amounts of additives added per unit time (in a case of continuous process) or per batch (in a case of batch process) | Increase the amounts of additives as loss-on-ignition of recovered sand and/or loss-on-ignition of reclaimed sand increases |
| Number of rotations of mixing blades | The number of rotations of mixing blades per unit time | Increase the number of rotations of mixing blades as loss-on-ignition of recovered sand and/or loss-on-ignition of reclaimed sand increases |
| Amount of mixed sand to be conditioned | The amount of mixed sand to be conditioned per unit time (in a case of continuous process) or per batch (in a case of batch process) | Reduce the amount of mixed sand to be conditioned as loss-on-ignition of recovered sand and/or loss-on-ignition of reclaimed sand increases |

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1 loss-on-ignition estimation apparatus
11 processor
12 primary memory
13 secondary memory
14 input-output interface
15 communication interface
16 bus
M1 loss-on-ignition estimation method
M11 preprocessing step
M12 estimation step
2 machine-learning apparatus
21 processor
22 primary memory
23 secondary memory
24 input-output interface
25 communication interface 26 bus
M2 machine-learning method
M21 step of constructing dataset for learning
M22 step of constructing learned model
S loss-on-ignition estimation system

The invention claimed is:

1. An apparatus configured to estimate loss-on-ignition, the apparatus comprising at least one processor configured to execute instructions to:
   estimate a loss-on-ignition of foundry sand using a learned model constructed by machine learning; and
   reduce an amount of recovered sand introduced during a sand reclamation step of a foundry sand conditioning cycle, in response to an increase in an estimated loss-on-ignition from the learned model, wherein:
   the learned model is configured to receive, as input, (1) sand weight data relating to a weight of the foundry sand detected in a calcination period and (2) at least one of (i) sand property data relating to one or more properties of the foundry sand, (ii) additive data relating to one or more additives added to the foundry sand, and (iii) calcination environment data relating to a calcination environment detected in the calcination period; and
   the learned model is configured to generate, as output, the estimated loss-on-ignition of the foundry sand or an estimated weight of the foundry sand after a predetermined period of calcination, the predetermined period being longer than the calcination period.

2. The apparatus according to claim 1, wherein:
   the sand weight data contains (i) a weight of the foundry sand detected at a point in time at which the calcination period started and (ii) a weight of the foundry sand detected at a point in time at which the calcination period ended; and
   the calcination period is shorter than 60 minutes.

3. The apparatus according to claim 1, wherein the sand property data contains at least one of (i) sand type, (ii) sand-to-metal ratio, (iii) amount of new sand introduced, and (iv) capacitance.

4. The apparatus according to claim 1, wherein the additive data contains at least one of (i) resin type, (ii) amount of resin added, (iii) hardening agent type, and (iv) amount of hardening agent added.

5. The apparatus according to claim 1, wherein the calcination environment data contains at least one of (i) furnace's internal temperature, (ii) furnace temperature, (iii) ambient temperature, (iv) gas pressure, and (v) gas quantity.

6. The apparatus according to claim 1, wherein the at least one processor is configured to execute instruction to set, in accordance with the estimated loss-on-ignition, one or more conditions in which one or more steps included in the foundry sand conditioning cycle are carried out.

7. The apparatus according to claim 6, wherein the one or more conditions are one or more of (i) conditions in which the sand reclamation step is carried out, (ii) conditions in which a mixing step is carried out, and (iii) conditions in which a new sand introducing step is carried out.

8. A method of loss-on-ignition estimation, comprising:
   estimating, by at least one processor, a loss-on-ignition of foundry sand using a learned model constructed by machine learning; and
   reducing an amount of recovered sand introduced during a sand reclamation step of a foundry sand conditioning cycle, in response to an increase in an estimated loss-on-ignition from the learned model, wherein:
   the learned model is configured to receive, as input, (1) sand weight data relating to a weight of the foundry sand detected in a calcination period and (2) at least one of (i) sand property data relating to one or more properties of the foundry sand, (ii) additive data relating to one or more additives added to the foundry sand, and (iii) calcination environment data relating to a calcination environment detected in the calcination period; and
   the learned model is configured to generate, as output, the estimated loss-on-ignition of the foundry sand or an estimated weight of the foundry sand after a predetermined period of calcination, the predetermined period being longer than the calcination period.

* * * * *